(12) United States Patent
McKenzie

(10) Patent No.: US 6,936,162 B1
(45) Date of Patent: Aug. 30, 2005

(54) THREE VALVE FILTER ELEMENT SUPPORT FOR FILTER CARTRIDGE

(75) Inventor: Darrell T. McKenzie, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 252 days.

(21) Appl. No.: 09/965,805

(22) Filed: Oct. 1, 2001

(51) Int. Cl.[7] .................. B01D 27/10; B01D 35/147
(52) U.S. Cl. .................. 210/130; 210/136; 210/430; 210/440; 137/512.4
(58) Field of Search .................. 210/117, 130, 210/136, 430, 440, 443, DIG. 17; 137/512.4, 512.3, 846, 511

(56) References Cited

U.S. PATENT DOCUMENTS

| 3,369,666 A | 2/1968 | Hullgren et al. |
|---|---|---|
| 3,567,023 A | 3/1971 | Buckman et al. |
| 3,785,491 A | 1/1974 | Dudinec et al. |
| 3,802,564 A | 4/1974 | Turman |
| 3,957,640 A | * 5/1976 | Stack |
| 4,144,168 A | 3/1979 | Thornton |
| 4,524,805 A | 6/1985 | Hoffman |
| 5,250,176 A | * 10/1993 | Daniel |
| 6,136,183 A | 10/2000 | Suzuki et al. |

* cited by examiner

*Primary Examiner*—Terry K. Cecil
(74) *Attorney, Agent, or Firm*—Millen, White, Zelano & Branigan, P.C.

(57) ABSTRACT

A unitary three valve filter element support is used in a filter cartridge in which the filter cartridge includes an annular filter element within a housing closed by an end plate having a central opening surrounded by an array of radial openings spaced a fixed radial distance from one another. The unitary support has an annular sealing lip for sealing with the end cap of the filter element, which sealing lip deflects under oil pressure providing a first valve to allow oil to bypass the filter element if the filter media of the filter element is clogged. A second valve is a dirty side anti-drainback valve that is provided by a radial flange projecting from the unitary body. A third valve is a clean side valve aligned with the hollow core of the annular filter element to prevent drainback of clean oil and to prevent refilling of the filter cartridge with used or unfiltered oil.

16 Claims, 1 Drawing Sheet

US 6,936,162 B1

THREE VALVE FILTER ELEMENT SUPPORT FOR FILTER CARTRIDGE

RELATED APPLICATIONS

This application is related to pending U.S. patent application Ser. No. 09/965,806, filed Oct. 1, 2001, titled "Combination Filter Element Support And Anti-Prefill Valve" and incorporated herein by reference in its entirety.

FIELD OF THE INVENTION

The present invention is directed to a three valve filter element support for filter cartridges. More particularly the present invention is directed to combination valve supports and sealing elements for use in filter cartridges, wherein the valve supports and sealing elements provide a bypass when filter elements within the filter cartridge are clogged; provide an anti-drainback capability when the filter cartridge is not actively filtering, and provide a clean side valve which prevents filling of a filter element core with used or unfiltered oil by filter installers.

BACKGROUND OF THE INVENTION

It is necessary and desirable for filter cartridges to have a bypass in case filter media in the filter cartridge becomes clogged so that the machine utilizing the fluid being filtered is not starved for fluid. For example, it is necessary for filter cartridges which filter lubricating oil used in internal combustion engines not to block the flow of oil to the engine if their filter media becomes clogged. It is also desirable to prevent oil from draining out of a filter cartridge when the fluid is not under pressure. For example, with internal combustion engines if the engine is not running, it is preferable to maintain oil in the cartridge so that when the engine is restarted, oil is immediately available for circulation.

It is also desirable to prevent unscrupulous filter installers from filling replacement filter cartridges with used or unfiltered oil.

During manufacture, when disparate parts are matched, the risk of failure is increased because one of the parts may be of inferior quality and adversely affect the reliability of the entire assembly. It is frequently time consuming and therefore costly to assemble a plurality of elements in order to configure an item reliably. Consequently, utilizing only a single element can be advantageous. This is especially the case with mass produced OEM and after market items such as filters for engine lubricating oil which are manufactured by the millions.

SUMMARY OF THE INVENTION

In view of the aforementioned considerations, the present invention is directed to a unitary filter element support and valve for mounting a filter element on an end plate within a filter cartridge, which filter element support comprises a valve body including portions adapted to engage both the filter element and the end plate. The valve body has a bypass valve portion unitary with valve body; an anti-drainback portion unitary with the valve body, and a clean side valve, unitary with valve body for preventing clean side drainback and for preventing pre-filling of the filter cartridge.

In a more specific aspect, the valve body is annular and aligns with a hollow core of the filter element with the clean side valve being positioned on a plate which spans an opening defined by the valve body.

In still a more specific aspect the clean side valve is a purse valve defined by converging walls and opening away from the core, allowing fluid to leave the hollow core under slight pressure but not to enter the hollow core.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
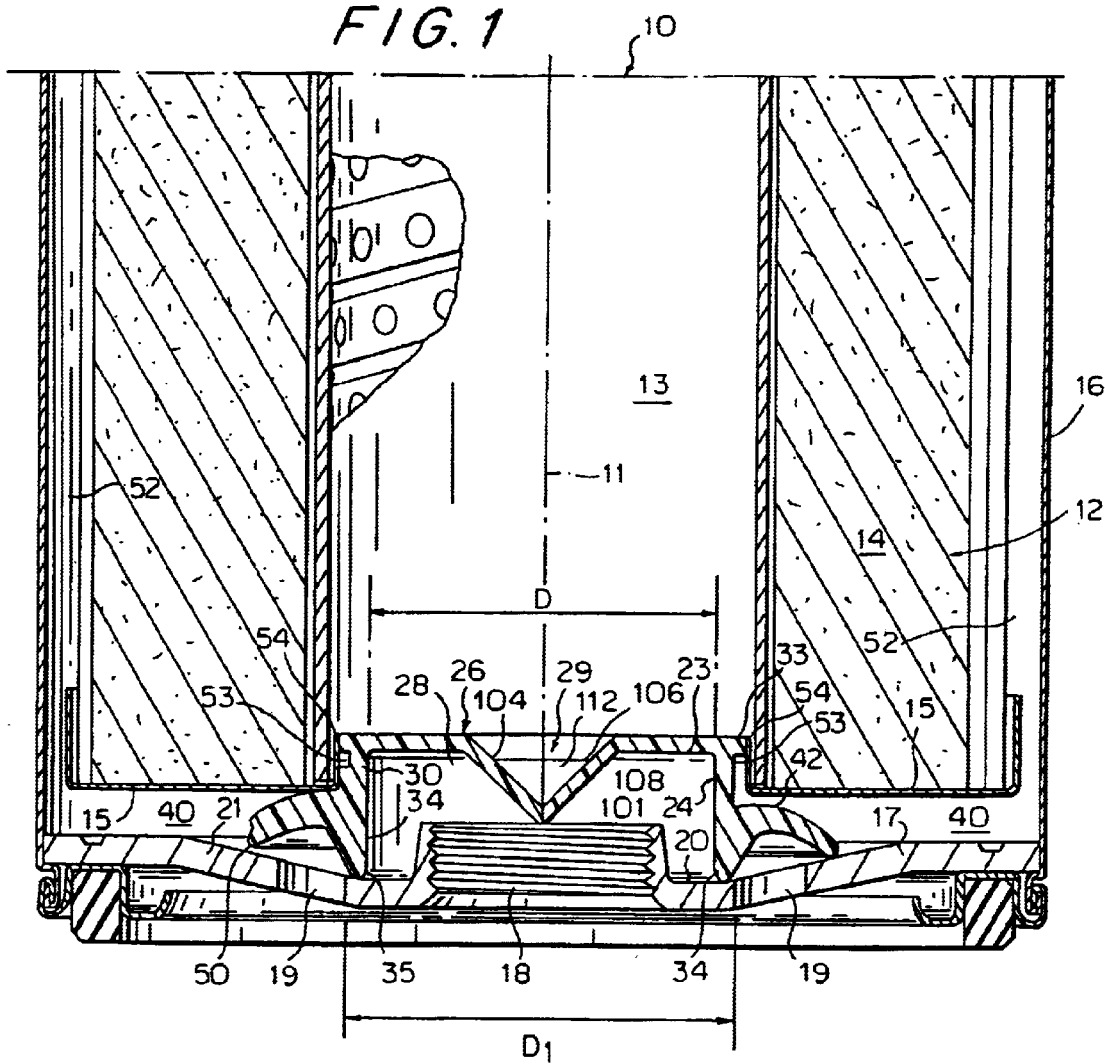
FIG. 1 is a side elevation showing a three valve filter element support in accordance with the present invention used in filter cartridge having a filter element therein.
Figure 2:
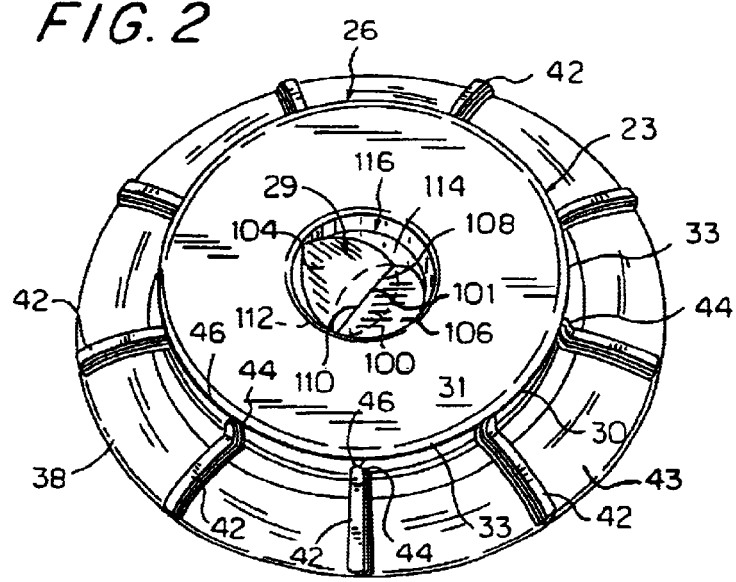
FIG. 2 is a perspective view of a three valve filter element support in accordance with the present invention.

Referring now to FIGS. 1 and 2, there is shown a filter cartridge 10 formed about an axis 11 which includes therein an annular filter element 12 having a hollow core 13. The annular filter element 12 includes a filter media 14 having an end closed by an end cap 15. A filter element 12 is disposed within a housing 16 closed by an end plate 17. The end plate 17 may be secured to the housing 16 in accordance with known practices.

The end plate 17 has a threaded central opening 18 so that the filter cartridge 10 can be mounted as a "spin-on" cartridge to a device such as, for example, an internal combustion engine. Disposed around the threaded central opening 18 are a plurality of openings 19 which are radially spaced from the threaded central opening 18 by an annular plate portion 20. Beyond the plurality of openings 19, there is a second plate portion 21 on the end plate 17.

The filter element 12 is supported on a valve support and sealing element 23 which is in the form of a unitary body 26 of resilient plastic material. Preferably, the unitary body 26 is molded of rubber, nitrile rubber, or another suitable flexible resilient material.

The unitary body 26 has a central opening 28 of a constant diameter D which is aligned with the hollow core 13 of the filter element. The central opening 28 is coaxial with the threaded central opening 18 of the end plate 17 and has a diameter less than the radial distance $D_1$ between the radial openings 19. Unitary with the unitary body 26 is a clean side valve 29 which is supported on a plate portion 31 that spans the central opening 28.

Unitary body 26 has a first annular section 30 which projects into the hollow core 13 of the filter element 12. The first annular section 30 has a sealing ring 33 thereon which seals with the end cap 15 of the filter element 12. As will be further explained hereinafter, sealing ring 33 defines a bypass valve for allowing fluid which enters the radially positioned openings 19 to bypass the filter 12 if the filter media 14 becomes clogged.

The unitary body 26 further includes a second section 34 which is coextensive with the first section 30 and seals with the end plate 17 by engaging the first end plate portion 20. Since the first section 30 and the second section 34 are unitary with a relatively large thickness, they provide a support for the filter element 12 which abuts and is urged against the unitary body 26 in a known way, such as for example, by a coil spring (not shown) at the upper end of the filter element 12. In the illustrated and preferred embodiment, the second section 34 has a frustoconical section which adds thickness and strength and directs the axial force exerted by the filter element 12 toward a sealing interface 35 with the first plate portion 20.

Unitary body 26 has a radially projecting flange 38 which is axially spaced from the sealing interface 35 and from the sealing ring 33 within the hollow core 13 of the filter element 12. The radially projecting flange 38 projects radially beyond the spaced radial openings 19 through the end plate 17 for sealing with the plate portion 21 outboard of the spaced radial openings 19. The radially projecting flange 38 thus provides an anti-drainback valve which closes off the openings 19 from radial space 40 between the end plate 17 on the housing 16 and the end cap 15 of the filter element 12.

A plurality of radially extending ribs 42 extend radially on the surface 43 of the radially extending flange 38. Radially extending ribs 42 have portions 44 which extend axially on the first annular section 30 of the unitary body 26. There are spaces 46 between the axially extending rib portions 44 and the ring 33 so that the ring 33 is not stiffened by the axially extending portions 44 of the ribs 42 and can flex under fluid pressure to deflect inwardly when the filter cartridge 10 is operating in a bypass mode due to clogging of the filter media 14.

Referring now mainly to FIG. 1, a fluid such as for example lubricating oil flows under pressure in through openings 19 which function as inlet openings and deflects the radially projecting flange 38 away from the outer plate portion 21. This deflection provides a gap 50 establishing communication between the radially spaced openings 19 and the annular space 40. The fluid then flows radially through the annular space 40 and up into an annular gap 52 between the housing 16 and filter media 14. Thereafter, the fluid then flows through the filter media 14 into the hollow core 13 of the filter element 12 and out through the threaded central opening 18. As long as the fluid is under pressure, the gap 50 remains open. However, once the fluid is depressurized, the radially projecting flange 38 recloses against the second plate portion 21. This prevents dirty fluid in the filter media 14, the annular gap 52 and the radial space 40 from flowing back out of the inlet openings 19 to the device using the filter. If for example the device using the filter is an internal combustion engine (not shown) and the fluid is lubricating oil, oil will remain within the housing 16 when the engine stops so that there is no momentary oil starvation of the engine when the engine restarts.

If the filter media 14 of the filter element 12 becomes clogged, then pressure builds up within the annular gap 52 and the radial space 40. This pressure is applied in the space 46 between the ribs 42 upon which the end cap 15 of the filter element 12 rests and thus radially against first section 30 of the unitary body 26 and directly against the annular sealing lip 33. This causes the sealing lip 33 to deflect inwardly away from the axially extending flange 53 of the end cap 15, allowing the oil to flow directly into the hollow core 13 without passing through the filter media 14. The annular flange 53 of the end cap 15 which seals the filter media 14 is a continuous cylindrical surface with no passages therethrough so that the fluid flows past the inner terminal edge 54 of the end cap, which edge lies in a single plane and is continuous without notches. The oil then flows from the central core 13 out of the threaded central opening 18 so that the engine is still supplied with oil even though the filter media 14 is clogged.

Referring now to the clean side valve 29 mounted on the plate portion 31, the plate portion 31 is molded unitarily with the unitary body 26 and extends transversely across the central opening 28 at the inner end of the first annular section 30. The clean side valve 29 preferably has a "purse valve" configuration, and is aligned with the axis 11 of the filter cartridge 10. An opening illustrated by dotted lines 100 occurs in the valve 29 when pressure within the hollow core 13 of the filter element 12 increases due to the engine (not shown) to which the filter canister 10 is attached running its oil pump. The opening 100 is normally shut along the line 101 due to the bias of opposed lips 104 and 106 which have web edges 108 and 110, respectively that normally meet at the line 101. The opposed lips 104 and 106 have side web portions 112 and 114 which close the concavity 116 defined by the lips 104 and 106 at the ends of the web edges 108 and 110. When fluid pressure with the hollow core increases the web portions 112 and 114 bow outwardly as the oil parts the opposed lips 104 and 106 along line 100 to create the opening 100.

When an attempt is made to fill the cartridge 10 by pouring used oil or some other fluid into the filter cartridge, the valve 29 remains shut. Since access to the valve 29 is through the small central opening 18 in the end plate 17, it is difficult to deflect the edges 108 and 110 of lips 104 and 106 from outside the filter cartridge 10 so as to create the opening 100 through which to insert used or unfiltered oil.

In addition, since when the engine is not running, the valve 29 is normally closed, the valve retains clean oil in the hollow core 13, which clean oil is available immediately upon starting the engine.

From the foregoing description, one skilled in the art can easily ascertain the essential characteristics of this invention, and without departing from the spirit and scope thereof, can make various changes and modifications of the invention to adapt it to various usages and conditions.

I claim:

1. A combination valve support and sealing element for use in a filter cartridge wherein the filter cartridge includes an annular filter element having a hollow core and an end cap and is disposed in a housing closed by an end plate having a central opening surrounded by an array of radial openings spaced a fixed radial distance from the central opening, the combination valve support and sealing element comprising:

a unitary body of flexible resilient material;

the unitary body having a central opening of a constant diameter, which central opening is coaxial with the central opening of the end plate, the diameter of the central opening being less than the diameter of the area circumscribed by the radial openings;

the unitary body having a first annular section which projects into the hollow core of the filter element for sealing with the filter element and a second section coextensive with the first section, the first annular section having an annular sealing ring thereon for sealing with the end cap and, the second section sealing only with the end plate around the central opening through the end plate;

the unitary body having a radially projecting flange which is axially spaced from the second section and projects radially beyond the spaced radial openings in the end plate for sealing around the spaced radial openings to provide an anti-drainback valve;

a plurality of radially extending ribs on the radially extending flange, the radially extending ribs having rib portions projecting axially on the first annular section of the unitary body and being axially spaced from the annular sealing ring on the first annular section of the unitary body, which annular sealing ring deflects inwardly when the filter element is clogged in order to provide a bypass for fluid when fluid is unable to flow through the filter element, and a clean side valve unitary with the unitary body for preventing pre-filling of the cartridge.

2. The combination valve support and sealing element of claim 1 wherein the clean side valve is a purse valve supported on a plate which spans the central opening of the unitary body, the purse valve being comprised of a pair of lips which are normally closed.

3. The combination valve support and sealing element of claim 1 wherein the axially extending rib portions engage an end cap on the filter element to support the filter element and provide axially extending gaps therebetween and wherein oil applies pressure to the sealing ring, which pressure causes the sealing ring to deflect inwardly when a preselected pressure indicative of a clogged filter element is reached.

4. A valve support and sealing element in combination with a filter cartridge in which the filter cartridge includes an annular filter element having a hollow core and end cap with a flange that extends into the hollow core, the filter cartridge being disposed in a housing closed by an end plate having a central opening surrounded by an array of radial openings spaced a fixed radial distance from the central opening, the combination comprising:

a unitary body of flexible resilient material;

the unitary body having a central opening of a constant diameter, which central opening is coaxial with the central opening of the end plate, the diameter of the central opening being less than the diameter of the area circumscribed by the radial openings;

the unitary body having a first annular section which projects into the hollow core of the filter element for sealing with the filter element and a second section coextensive with the first annular section, the first annular section having an annular sealing ring thereon for sealing with the flange of the end cap and, the second section sealing only with the end plate around the central opening through the end plate;

the unitary body having a radially projecting flange which is axially spaced from the second section and projects radially beyond the spaced radial openings in the end plate for sealing around the spaced radial openings to provide an anti-drainback valve, a plurality of radially extending ribs on the radially extending flange, the radially extending ribs having rib portions projecting axially on the first annular section of the unitary body and being axially spaced from the annular sealing ring on the first annular section of the unitary body, which annular sealing ring deflects inwardly when the filter element is clogged in order to provide a bypass for oil when oil is unable to flow through the filter element, and a clean side valve unitary with the unitary valve body for preventing pre-filling of the cartridge.

5. The combination valve support and sealing element of claim 4 wherein the clean side valve is a purse valve supported on a plate which spans the central opening of the unitary body, the purse valve being comprised of a pair of lips which are normally closed.

6. The combination of claim 5 wherein axially extending rib portions engage the end cap on the filter element to support the filter element and provide axially extending gaps therebetween and wherein oil applies pressure to the sealing ring, which pressure causes to the sealing ring to deflect inwardly away from the end cap flange when a preselected pressure indicative of a clogged filter element is reached.

7. The combination of claim 5 wherein the flexible resilient material of the unitary body is rubber.

8. A unitary valve within a filter cartridge disposed between a filter element and an end plate, comprising:

a unitary valve body of resilient flexible material including a bypass valve portion unitary with the valve body, the bypass valve portion being configured as a collar having a sealing portion for sealing with the filter element and spaced projections upstream of the sealing portion, the spaced projections being disposed between and engaging both the bypass valve portion and the filter element for allowing direct fluid pressure application to the sealing portion, wherein when the filter element is clogged, increased fluid pressure separates the sealing portion from the filter element allowing the fluid to bypass the filter element, and a clean side valve portion unitary with the unitary valve body for preventing pre-filling of the filter cartridge.

9. The unitary valve according to claim 8 wherein an anti-drainback valve configured as a skirt extends radially from the collar portion.

10. The unitary valve according to claim 9 wherein ribs extend over the skirt to provide channels between the filter element and valve body for applying fluid pressure to the sealing portion.

11. The unitary valve of claim 10 wherein the resilient flexible material is rubber or nitrile rubber.

12. The unitary valve according to claim 11 wherein ribs extend over the valve body to provide channels for applying fluid pressure to the annular lip.

13. The unitary valve according to claim 8 wherein the projections are ribs on the collar.

14. The unitary valve according to claim 8 wherein the sealing portion is an annular lip.

15. The unitary valve according to claim 8 wherein the valve includes a portion abutted by the filter element for supporting the filter element thereon.

16. The unitary valve of claim 8 wherein the clean side valve portion includes a purse valve supported on a plate which spans a central opening of the unitary body, the purse valve being comprised of a pair of lips which are normally closed.

* * * * *